US012699307B2

(12) United States Patent
Moon et al.

(10) Patent No.: US 12,699,307 B2
(45) Date of Patent: Aug. 4, 2026

(54) CAMERA MODULE

(71) Applicant: LG INNOTEK CO., LTD., Seoul (KR)

(72) Inventors: Da Hin Moon, Seoul (KR); Je Kyung Park, Seoul (KR); Sang Yeal Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 108 days.

(21) Appl. No.: 18/681,321

(22) PCT Filed: Aug. 1, 2022

(86) PCT No.: PCT/KR2022/011260
§ 371 (c)(1),
(2) Date: Feb. 5, 2024

(87) PCT Pub. No.: WO2023/013999
PCT Pub. Date: Feb. 9, 2023

(65) Prior Publication Data
US 2024/0361675 A1     Oct. 31, 2024

(30) Foreign Application Priority Data
Aug. 3, 2021     (KR) ........................ 10-2021-0102089

(51) Int. Cl.
*G03B 17/12* (2021.01)
*G03B 30/00* (2021.01)

(52) U.S. Cl.
CPC ............. *G03B 17/12* (2013.01); *G03B 30/00* (2021.01); *G03B 2217/002* (2013.01)

(58) Field of Classification Search
CPC ........ G03B 30/00; H04N 23/51; H04N 23/54; H04N 23/57; B60R 11/04
See application file for complete search history.

(56) References Cited

U.S. PATENT DOCUMENTS

| | | | |
|---|---|---|---|
| 6,518,864 B1 | 2/2003 | Ito et al. | |
| 8,970,700 B2 * | 3/2015 | Inoue | H04N 23/52 |
| | | | 348/148 |

(Continued)

FOREIGN PATENT DOCUMENTS

| | | | | |
|---|---|---|---|---|
| CN | 110557531 A | * 12/2019 | ............. | G03B 17/02 |
| CN | 110602356 A | * 12/2019 | ............... | G02B 7/02 |

(Continued)

OTHER PUBLICATIONS

International Search Report dated Nov. 4, 2022 in International Application No. PCT/KR2022/011260.

(Continued)

*Primary Examiner* — Leon W Rhodes, Jr.

(74) *Attorney, Agent, or Firm* — SALIWANCHIK, LLOYD & EISENSCHENK

(57) ABSTRACT

A camera module comprises: a lens holder; a first body in which the lens holder is disposed; a second body coupled to the first body; a substrate disposed between the first body and the second body; and an adhesive for coupling the first body to the second body, wherein the first body includes a first protruding part, the second body includes a second groove facing the first protruding part, and the second groove has an inclined surface which is disposed on the bottom surface thereof and of which the distance to the first protruding part in the direction of an optical axis gradually increases toward the outer side thereof.

18 Claims, 8 Drawing Sheets

(56)                References Cited

U.S. PATENT DOCUMENTS

| | | | | |
|---|---|---|---|---|
| 9,992,392 | B2 * | 6/2018 | Byrne | H04N 23/54 |
| 10,264,219 | B2 * | 4/2019 | Mleczko | H04N 7/183 |
| 10,313,572 | B2 * | 6/2019 | Wöhlte | H04N 7/183 |
| 10,440,242 | B2 * | 10/2019 | Ahn | G03B 17/02 |
| 11,199,757 | B2 * | 12/2021 | Nakamura | G03B 17/08 |
| 11,597,331 | B2 * | 3/2023 | Abe | G03B 30/00 |
| 11,611,688 | B2 * | 3/2023 | Han | H04N 23/51 |
| 2014/0132768 | A1 | 5/2014 | Choi et al. | |
| 2015/0015778 | A1 | 1/2015 | Lee | |
| 2018/0255213 | A1 | 9/2018 | Ahn et al. | |
| 2019/0028620 | A1 | 1/2019 | Park | |
| 2019/0373142 | A1 | 12/2019 | Fujiwara et al. | |
| 2020/0053258 | A1 | 2/2020 | Park et al. | |
| 2020/0292918 | A1 | 9/2020 | Park | |

FOREIGN PATENT DOCUMENTS

| | | | |
|---|---|---|---|
| EP | 2 136 552 A1 | 12/2009 | |
| EP | 3 346 692 A1 | 7/2018 | |
| JP | 62-261157 A | 11/1987 | |
| JP | 2005-316484 A | 11/2005 | |
| JP | 2018-98660 A | 6/2018 | |
| JP | 2020-141229 A | 9/2020 | |
| JP | 2021-57629 A | 4/2021 | |
| JP | 2021-67950 A | 4/2021 | |
| KR | 10-2011-0132239 A | 12/2011 | |
| KR | 20150075974 A * | 7/2015 | H04N 23/51 |
| KR | 10-2017-0027073 A | 3/2017 | |
| KR | 10-2019-0004457 A | 1/2019 | |
| KR | 10-2019-0118771 A | 10/2019 | |
| KR | 10-2020-0037498 A | 4/2020 | |
| KR | 10-2021-0057414 A | 5/2021 | |

OTHER PUBLICATIONS

Supplementary European Search Report dated Apr. 28, 2025 in European Application No. 22853377.4.

Office Action dated Apr. 28, 2026 in Japanese Application No. 2024-507038.

* cited by examiner

CAMERA MODULE

CROSS-REFERENCE TO RELATED APPLICATIONS

This application is the U.S. national stage application of International Patent Application No. PCT/KR2022/011260, filed Aug. 1, 2022, which claims the benefit under 35 U.S.C. § 119 of Korean Application No. 10-2021-0102089, filed Aug. 3, 2021, the disclosures of each of which are incorporated herein by reference in their entirety.

TECHNICAL FIELD

The teachings in accordance with exemplary and non-limiting embodiments of this invention relate generally to a camera module.

BACKGROUND ART

In recent years, subminiature camera modules have been developed, and subminiature camera modules are widely used in small electronic products such as smartphones, laptops, game consoles, etc.

With the popularity of automobiles, subminiature cameras are not only used in small electronic products, but also in vehicles. For example, the subminiature cameras are used as dash (black box) cameras for vehicle protection or objective data of traffic accidents, rear view cameras that allow the driver to monitor the blind spots at the rear of the vehicle through the screen to ensure safety when reversing, and perimeter detection cameras that can monitor the surroundings of the vehicle.

The camera may comprise a lens, a lens holder for receiving the lens, an image sensor for converting an image of a subject gathered by the lens into an electrical signal, and a printed circuit board on which the image sensor is mounted. The housing forming the exterior of the camera may have an enclosed structure throughout to inhibit contamination of the internal components with foreign matters, including moisture.

DETAILED DESCRIPTION OF INVENTION

Technical Subject

It is an object of the present invention to provide a camera module whose structure can be improved to further enhance the electrical characteristics of the camera module, and to provide a camera module that can maintain a robust bond between the plurality of bodies.

Technical Solution

A camera module according to an exemplary embodiment of the present invention may comprise: a lens holder; a first body in which the lens holder is disposed; a second body coupled to the first body; a substrate disposed between the first body and the second body; and an adhesive for coupling the first body to the second body, wherein the first body includes a first protruding part, the second body includes a second groove facing the first protruding part, and the second groove has an inclined surface which is disposed on the bottom surface thereof and of which the distance to the first protruding part in the direction of an optical axis gradually increases toward the outer side thereof.

Preferably, but not necessarily, a first coupling hole may be disposed on a lower surface of the first body, and the substrate may include a second coupling hole facing the first coupling hole, and a screw penetrating the second coupling hole and coupling the first coupling hole.

Preferably, but not necessarily, the first protruding part may decrease in thickness downwardly.

Preferably, but not necessarily, the first body may include a first ground portion contacting an upper surface of the substrate, and the second body may include a third ground portion contacting a lower surface of the substrate.

Preferably, but not necessarily, the first body may include a first guide, and the substrate may include a second hole through which the first guide passes.

Preferably, but not necessarily, the second body may include a guide hole through which the first guide is coupled.

Preferably, but not necessarily, the second body may include a second guide, and the substrate may include a third hole through which the second guide penetrates.

Preferably, but not necessarily, an outer surface of the first body may be disposed outwardly from an outer surface of the second body.

A camera module according to another exemplary embodiment may comprise: a lens holder; a first body in which the lens holder is disposed; a second body coupled to the first body; a substrate disposed between the first body and the second body; and an adhesive for coupling the first body and the second body, wherein a first coupling hole is disposed on a lower surface of the first body, the substrate includes a second coupling hole facing the first coupling hole, and a screw passing through the second coupling hole and coupled to the first coupling hole.

A camera module according to still another exemplary embodiment may comprise: a lens holder; a first body in which the lens holder is disposed; a second body coupled to the first body; a substrate disposed between the first body and the second body; and an adhesive for coupling the first body and the second body, the first body comprising a first protruding part, a first groove disposed on an inner side of the first protruding part, and the second body comprising a second groove facing the first protruding part, a second protruding part facing the first groove, wherein the adhesive is disposed between the first protruding part and the second groove, and between the second protruding part and the first groove, and wherein a surface of at least one of the first protruding part, the first groove, the second protruding part, and the second groove is formed in a pattern with an exposed metal layer of the first body or the second body.

Advantageous Effect

Since the first body, the second body, and the printed circuit board are electrically connected to form a ground region through the exemplary embodiments, electromagnetic waves generated in the circuit region of the printed circuit board can be inhibited from radiating outwardly and affecting adjacent electronic components, or from entering the printed circuit board, whereby the electrical characteristics of the camera module can be further improved, and the inclusion of noise in the electrical signals can be inhibited, resulting in superior quality images.

Furthermore, in the coupling (bonding) area through the adhesive of the first body and the second body, the pattern structure through the inclined plane and the metal layer can advantageously secure a large area for the placement of the adhesive, so that the coupling (bonding) force of the first body and the second body can be maintained more firmly.

BEST MODE

Hereinafter, exemplary embodiments of the present invention will be described in detail with reference to the accompanying drawings.

However, the present invention is not limited to the given exemplary embodiments described, but may be implemented in a variety of different forms, and one or more of components among the exemplary embodiments may be optionally combined or substituted between embodiments within the scope of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, in explaining the components of exemplary embodiments of the present invention, the terms first, second, A, B, (a), (b), and the like may be used. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

As used herein, "optical axis direction" is defined as the optical axis direction of the lens. On the other hand, "optical axis direction" may correspond to "up and down direction", "z-axis direction", etc.

Hereinafter, the present invention will be described in more detail with reference to the accompanying drawings.

Figure 1:
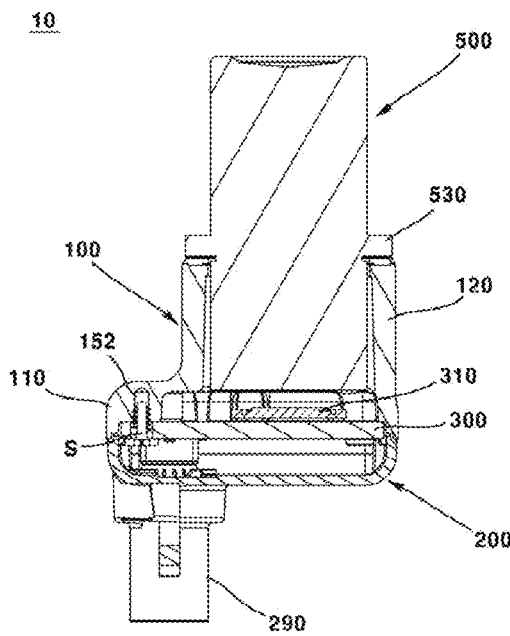
FIG. 1 is a perspective view illustrating the appearance of a camera module according to an exemplary embodiment of the present invention.
Figure 2:
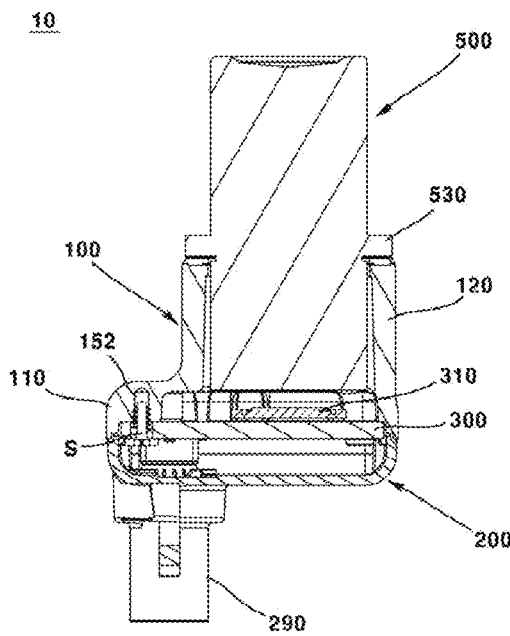
FIG. 2 is a cross-sectional view of a camera module according to an exemplary embodiment of the present invention.
Figure 3:
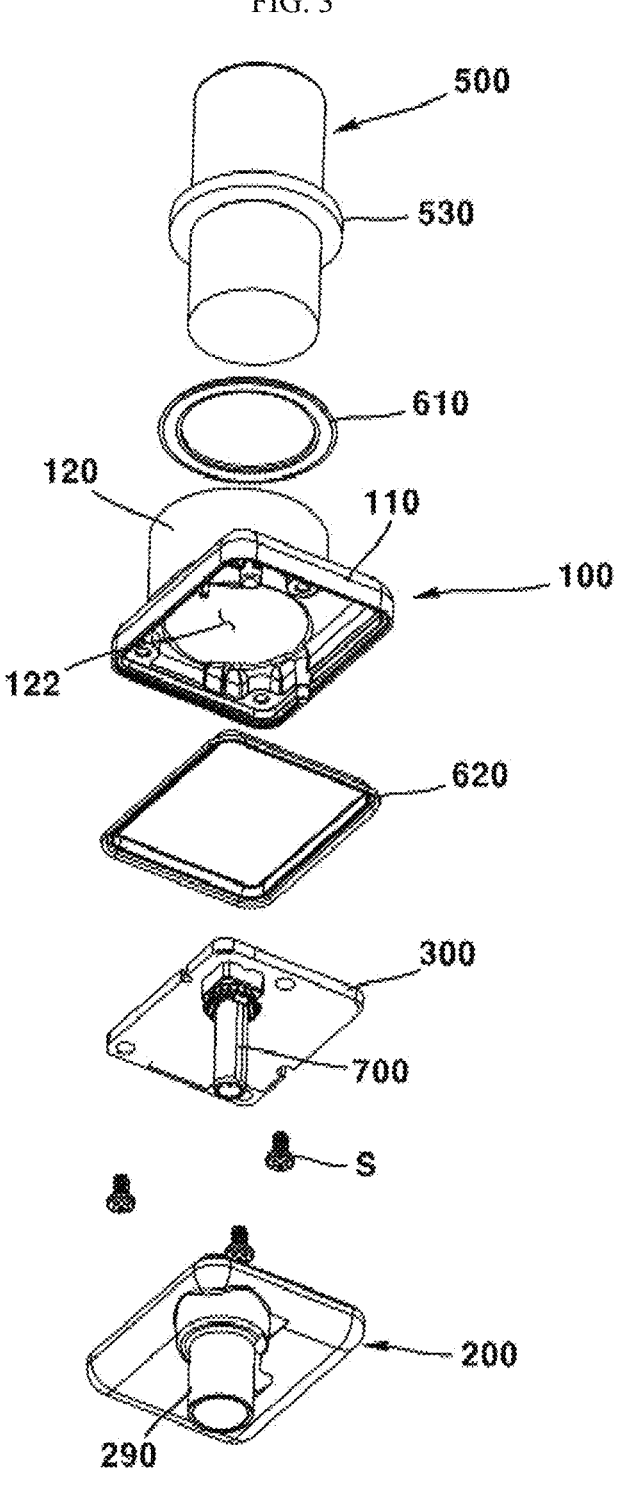
FIG. 3 is an exploded perspective view of a camera module according to an exemplary embodiment of the present invention.
Figure 4:
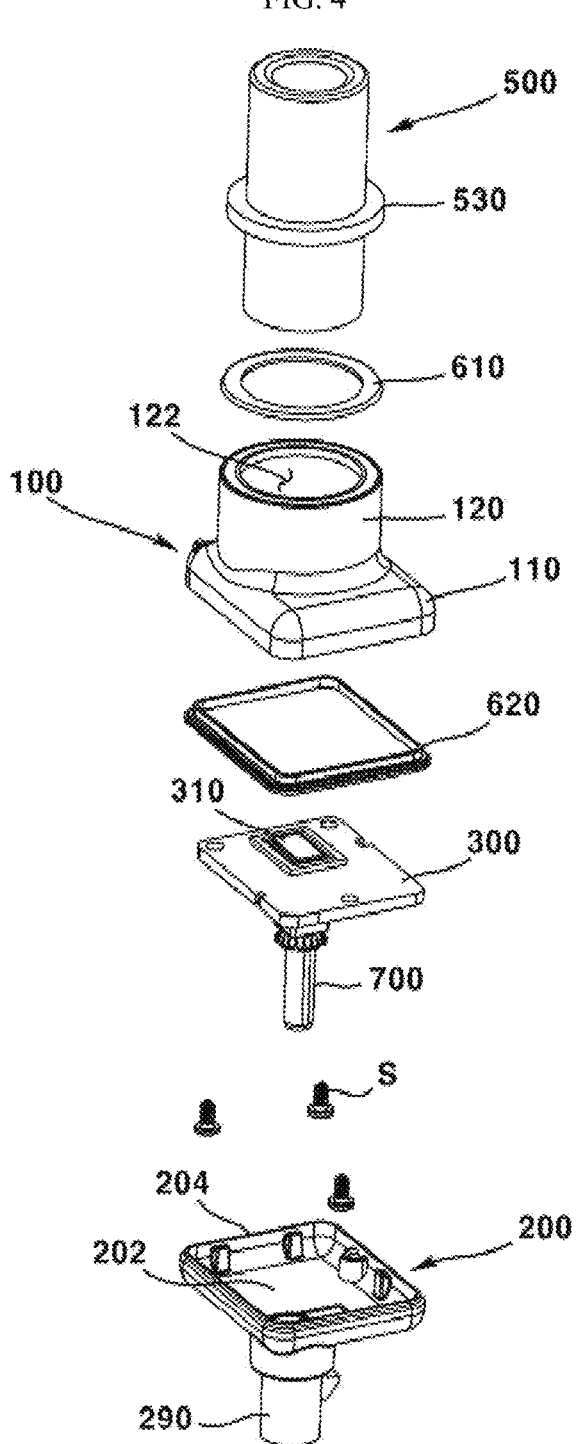
FIG. 4 is a drawing illustrating FIG. 3 from another angle.
Figure 5:
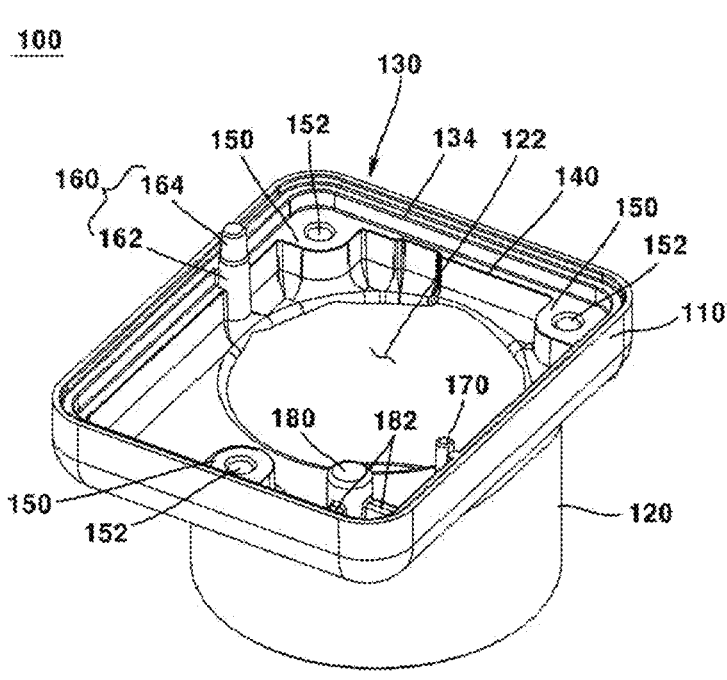
FIG. 5 is a front perspective view of a first body according to an exemplary embodiment of the present invention.
Figure 6:
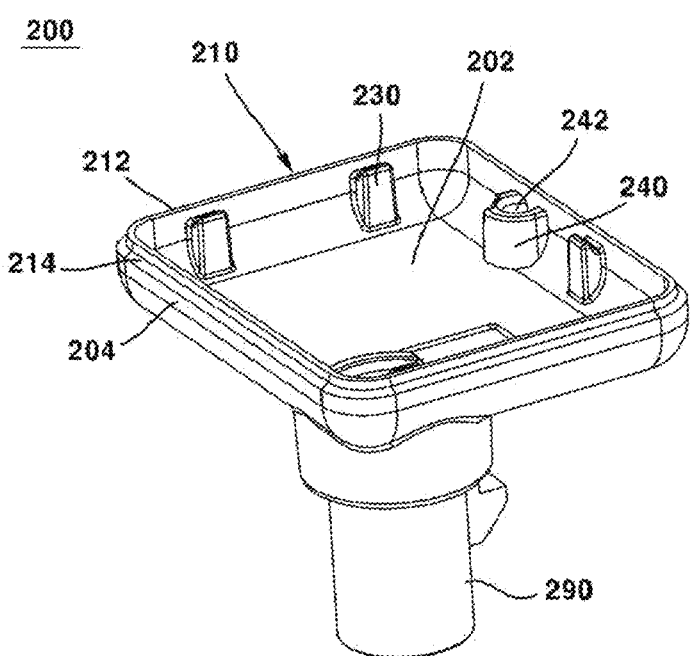
FIG. 6 is a top view of a second body according to an exemplary embodiment of the present invention.
Figure 7:
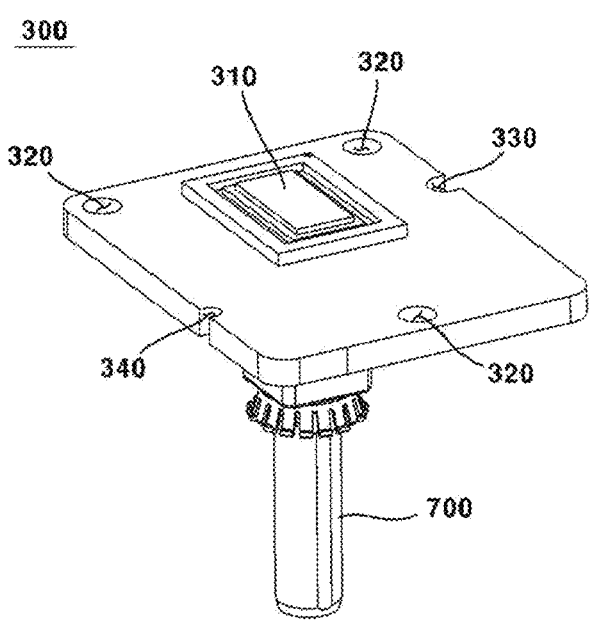
FIG. 7 is a perspective view of a substrate according to an exemplary embodiment of the present invention.
Figure 8:
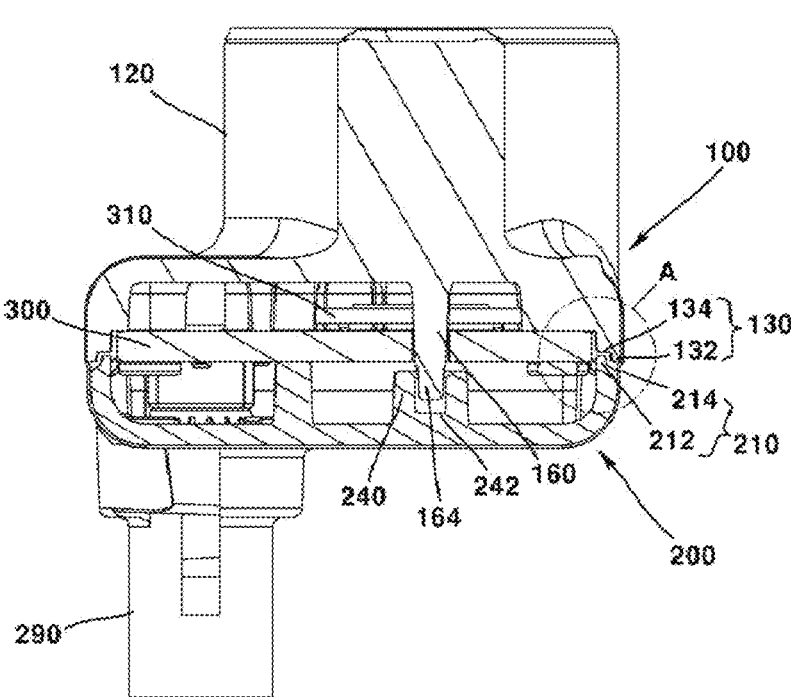
FIG. 8 is a cross-sectional view illustrating the coupling structure of the first body and the second body according to an exemplary embodiment of the present invention.
Figure 9:
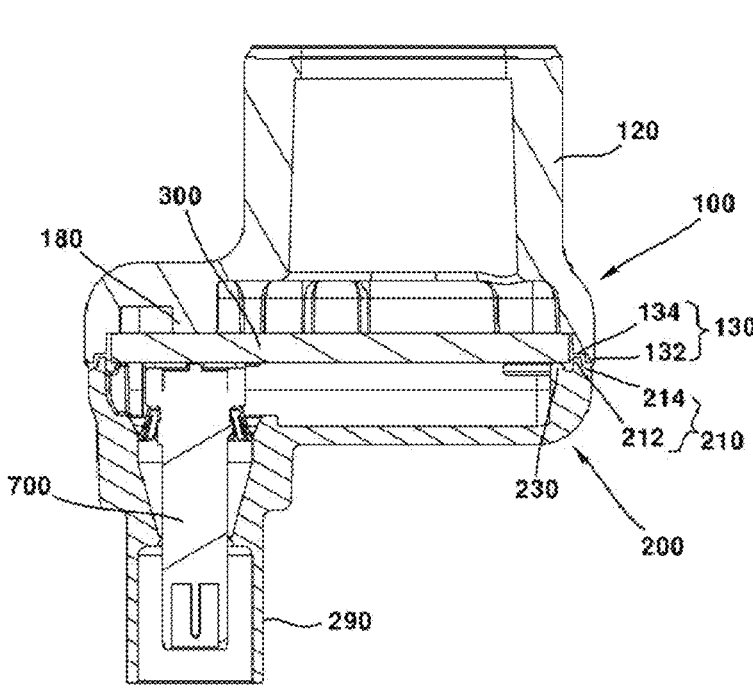
FIG. 9 is a cross-sectional view illustrating the coupling structure of the first body and the second body according to an exemplary embodiment of the present invention from another angle.
Figure 10:
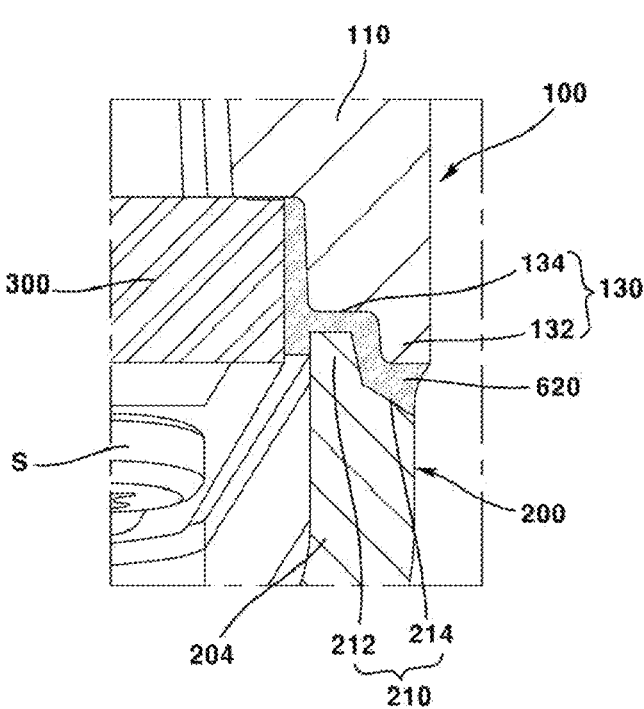
FIG. 10 is an enlarged view of A of FIG. 8.
Figure 11:
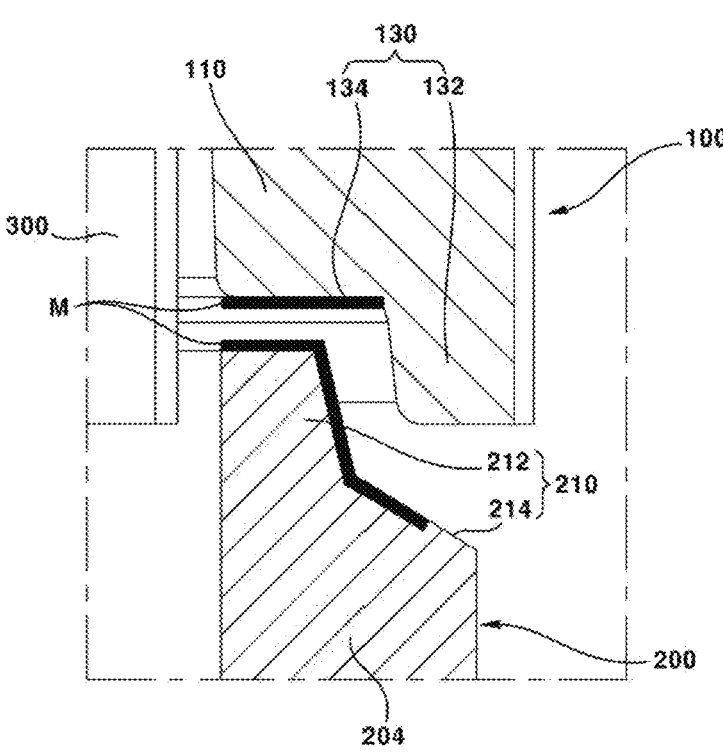
FIG. 11 is a drawing of FIG. 10 excluding the adhesive.
Figure 12:
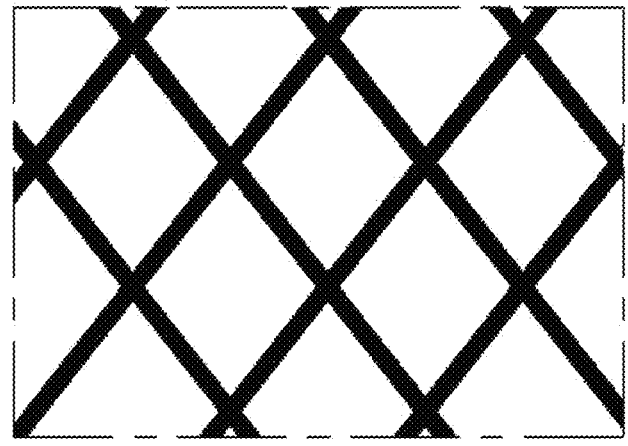
FIG. 12 is a drawing illustrating a metal pattern according to an exemplary embodiment of the present invention.
Figure 13:
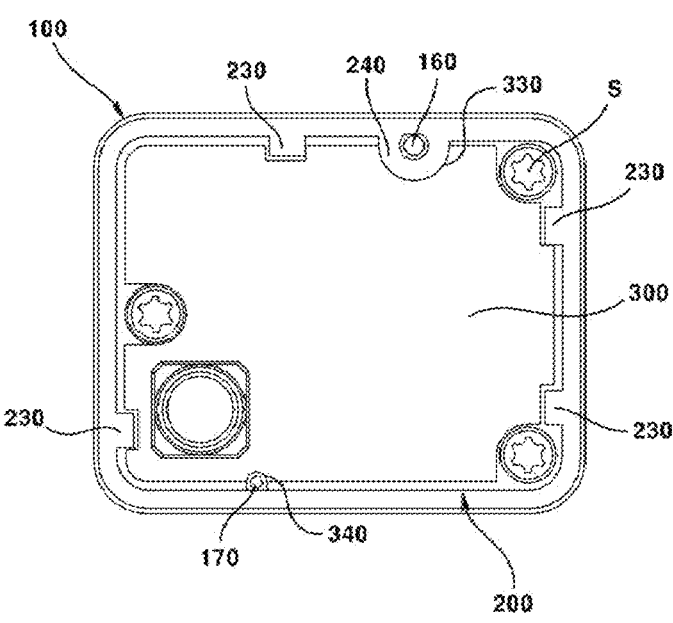
FIG. 13 is a top view illustrating a coupling structure of a printed circuit board in a first body and a second body, viewed from below, according to an exemplary embodiment of the present invention.
Figure 14:
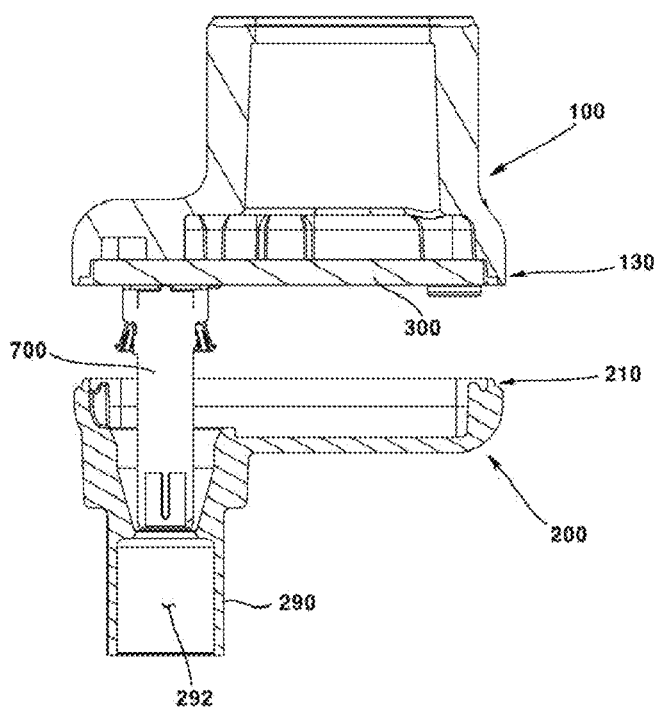
FIG. 14 is a diagram illustrating the coupling process of the first body and the second body, according to an exemplary embodiment of the present invention.

FIG. 1 is a perspective view illustrating the appearance of a camera module according to an exemplary embodiment of the present invention, FIG. 2 is a cross-sectional view of a camera module according to an exemplary embodiment of the present invention, FIG. 3 is an exploded perspective view of a camera module according to an exemplary embodiment of the present invention, FIG. 4 is a drawing illustrating FIG. 3 from another angle, FIG. 5 is a front perspective view of a first body according to an exemplary embodiment of the present invention, FIG. 6 is a top view of a second body according to an exemplary embodiment of the present invention, FIG. 7 is a perspective view of a substrate according to an exemplary embodiment of the present invention, FIG. 8 is a cross-sectional view illustrating the coupling structure of the first body and the second body according to an exemplary embodiment of the present invention, FIG. 9 is a cross-sectional view illustrating the coupling structure of the first body and the second body according to an exemplary embodiment of the present invention from another angle, FIG. 10 is an enlarged view of A of FIG. 8, FIG. 11 is a drawing of FIG. 10 excluding the adhesive, FIG. 12 is a drawing illustrating a metal pattern according to an exemplary embodiment of the present invention, FIG. 13 is a top view illustrating a coupling structure of a printed circuit board in a first body and a second body, viewed from below, according to an exemplary embodiment of the present invention, and FIG. 14 is a diagram illustrating the coupling process of the first body and the second body, according to an exemplary embodiment of the present invention.

Referring to FIGS. 1 to 14, the camera module (10) according to an exemplary embodiment of the present invention may be a vehicle camera module. The camera module (10) may be coupled to a vehicle. The camera module (10) may be used in one or more of a front camera, a side camera, a rear camera, and a black box of the vehicle. The camera module (10) may be disposed at the front of the vehicle. The camera module (10) may be disposed at the rear of the vehicle. The camera module (10) may be coupled to a windscreen of the vehicle. The camera module (10) may be coupled to the windscreen of the front or rear of the vehicle. The camera module (10) may be disposed on the side of a vehicle. The camera module (10) may photograph a subject and output an image to a display (not shown).

The camera module (10) may include a first body (100). The first body (100) may be referred to as any one of a front body, an upper housing, or a first housing. The first body (100) may include a body portion (110). The first body (100) may include a barrel portion (120). The first body (100) may include a lens holder (500). The body portion (110), barrel portion (120), and lens holder (500) of the first body (100) may be integrally formed. Any two or more of the body portion (110), barrel portion (120), and lens holder (500) of the first body (100) may be integrally formed. In a modification, the body portion (110), the barrel portion (120), and the lens holder (500) may each be formed separately.

The body portion (110) may be coupled to the barrel portion (120). The body portion (110) may be integrally formed with the barrel portion (120). The body portion (110) may be formed of a metal material. The body portion (110) may be disposed over the second body (200), which will be described later. The body portion (110) may be coupled to the second body (200). A lower end of the body portion (110) may be secured to the second body (200). The body portion (110) may be coupled to the second body (200) by an adhesive. The body portion (110) may be coupled to the substrate (300), which will be described later.

The body portion (110) may be formed as a rectangular shape with an opening at the bottom. In this case, the corners of the body portion (110) may be rounded. The body portion (110) may include a top plate (111) and a first side plate (112) extending downwardly from the top plate (111). The top plate (111) may be formed in a rectangular shape. The top plate (111) may extend outwardly from a lower outer peripheral surface of the barrel portion (120). A first side plate (112) may extend downwardly from an outer edge of the top plate (111). The first side plate (112) may comprise a plurality of plates. The first side plate (112) may comprise four side plates. The first side plate (112) may be formed in the shape of a square plate. The first side plate (112) may include a first-1 side plate and a first-2 side plate, a first-3 side plate disposed opposite the first-1 side plate, and a first-4 side plate disposed opposite the first-2 side plate. The first side plate (112) may include first and fourth corners disposed among the first-1 to first-4 side plates, respectively. Each of the first to fourth corners may include a rounded shape in at least a portion. On an inner side of the body portion (110), a space portion may be formed that is compartmentalized from the other regions. The space portion may be open at the bottom and covered at the top by the barrel portion (120) and the lower surface of the lens holder (500).

The body portion (110) may include a first edge region (130). The first edge region (130) may be disposed on an outer side of the space portion. The first edge region (130) may form a lower surface of the body portion (110).

The first edge region (130) may include a first protruding part (132) and a first groove (134). Relative to the center of the body portion (110), the first groove (134) may be disposed on an inner side of the first protruding part (132). A lower surface of the body portion (110) may be defined as a lower surface of the first groove (134). The first groove (134) may be a region formed by the first protruding part (132) projecting from the lower surface of the body portion (110).

The first protruding part (132) may be formed to project downwardly from the lower surface of the body portion (110) than other regions. A lower surface of the first protruding part (132) may be disposed lower than an upper surface of the substrate (300). A lower surface of the first protruding part (132) may be disposed lower than a lower surface of the first groove (134).

The inner surface of the first protruding part (132) may be formed with a slope such that the thickness of the first protruding part (132) becomes thinner towards the lower end. Here, the thickness of the first protruding part (132) may be a length defined in a direction perpendicular to the optical axis direction. A first groove (134) may be disposed on an inner side of the first protruding part (132). A bottom surface of the first groove (134) may be disposed lower than an upper surface of the substrate (300), and an upper surface of the substrate (300) may be disposed higher than a bottom surface. The bottom surface of the first groove (134) may be disposed above the lower end of the first protruding part (132). The first body (100) may include a barrel portion (120). The barrel portion (120) may be a lens barrel. The barrel portion (120) may be formed of a metal material. The barrel portion (120) may be disposed on the body portion (110). The barrel portion (120) may extend from an upper surface of the body portion (110).

The barrel portion (120) may be integrally formed with the body portion (110). In a modification, the barrel portion (120) may be coupled to the body portion (110). In this case, the barrel portion (120) may be secured to the body portion (110) by an adhesive. The barrel portion (120) may accommodate the lens holder (500) therein. The barrel portion (120) may include a hole (122). The lens holder (500) may be disposed in the hole (122) of the barrel portion (120). The inner circumferential surface of the hole in the barrel portion (120) may be formed in a shape and size that corresponds to the outer circumferential shape of the lens holder (500).

The first body 100 may include a first ground portion (140). The first ground portion (140) may be formed to project downwardly from a lower surface of the top plate (111). The first ground portion (140) may be shaped to project inwardly from an inner surface of the side plate (112). The first ground portion (140) may be disposed on an inner surface of the first groove (134). The inner surface of the first ground portion (140) may form the inner surface of a space within the first body (100). The first ground portion (140) may be disposed along an edge of the body portion (110). A lower surface of the first ground portion (140) may be disposed above a bottom surface of the first groove (134). A lower surface of the first ground portion (140) may contact an upper surface of the substrate (300). The region of the substrate (300) in contact with the lower surface of the first ground portion (140) may be a ground region.

The first body (100) may include a second ground portion (180). The second ground portion (180) may be disposed on an inner side of the first ground portion (140). The second ground portion (180) may be formed by projecting downwardly from a lower surface of the top plate (111). The second ground portion (180) may have a circular cross-sectional shape. The second ground portion (180) may be disposed a predetermined distance apart from the inner surface of the first ground portion (140). The second ground portion (180) may be disposed adjacent to a corner region of the first body (100). A lower surface of the second ground portion (180) may contact an upper surface of the substrate (300). The region of the substrate (300) in contact with the lower surface of the second ground portion (180) may be a ground region.

To increase the rigidity of the second ground portion (180), a stiffener (182) may be disposed between the second ground portion (180) and the inner surface of the first ground portion (140). The stiffener (182) may be formed to connect the first ground portion (140) and the second ground portion (180). The stiffener (182) may be plural, and may be spaced apart along the circumferential direction of the second ground portion (180). The plurality of sides of the first body (100) that are connected to the second ground portion (180) by the plurality of stiffeners (182) may be mutually neighboring surfaces. Through the first ground portion (140) and the second ground portion (180), the first body (100) may implement a ground structure with the substrate (300).

The first body (100) may include a first guide (160). The first guide (160) may be formed to project downwardly from a lower surface of the top plate (111). The first guide (160) may be disposed adjacent to one side of the side plate (112). The first guide (160) may be disposed on an inner side of the first protruding part (132). A region of the first ground portion (140) corresponding to the formed region of the first guide (160) may have a grooved shape. A lower surface of the first guide (160) may be disposed lower than a lower surface of the first protruding part (132). A lower surface of the first guide (160) may be disposed lower than a lower surface of the first ground portion (140) and the second ground portion (180). The first guide (160) may be disposed to penetrate the substrate (300).

The first guide (160) may include a first-1 guide (162) projecting from a lower surface of the top plate (111), and a first-2 guide (164) projecting downwardly from a lower end of the first-1 guide (162). The first-2 guide (164) may be disposed to penetrate the substrate (300). The cross-sectional area of the first-2 guide (164) may be formed to be smaller than the cross-sectional area of the first-1 guide (162).

The first body (100) may include a second guide (170). The second guide (170) may be formed to project downwardly from a lower surface of the top plate (111). The second guide (170) may be disposed adjacent to the other side of the side plate (112). One side of the side plate (112) on which the first guide (160) is disposed and the other side of the side plate (112) on which the second guide (170) is disposed may be opposite each other. The second guide (170) may have a shape that protrudes inwardly from the inner surface of the first ground portion (140). The second guide (170) may be disposed on an inner side of the first ground portion (140). A lower surface of the second guide (170) may be disposed above a lower surface of the first guide (160). A lower surface of the second guide (170) may be disposed lower than a lower surface of the first ground portion (140). The second guide (170) may be disposed so that at least a portion of the same penetrates the substrate (300).

The first body (100) may include a first coupling portion (150). The first coupling portion (150) may have a shape that protrudes inwardly from an inner surface of the side plate (112). A lower surface of the first coupling portion (150) may be disposed to form a plane coplanar with a lower surface of the first ground portion (140). A lower surface of the first coupling portion (150) may contact an upper surface of the substrate (300). The region of the substrate (300) in contact with the lower surface of the first coupling portion (150) may be a ground region. The first coupling portion (150) may include a first coupling hole (152). The first coupling hole (152) may have a shape in which a portion of a lower surface of the first coupling portion (150) is recessed upwardly. The first coupling hole (152) may be coupled with a screw(S), which will be described later. Accordingly, the substrate (300) and the second body (200) may be screwed to the first coupling portion (150).

The first coupling portion (150) may comprise a plurality of coupling portions spaced apart from each other. For example, there may be three first coupling portions (150) spaced apart from each other. Two of the three first coupling portions (150) may be disposed in a first corner region and a second corner region, respectively, which are disposed adjacent to each other in the first body (100). The remaining one first coupling portion (150) of the three first coupling portions (150) may be disposed on a side opposite to the side connecting the first and second corner regions. The first guide (160) and the second guide (170) can guide the substrate (300) to engage in the correct position when engaging with the first body (100), and can also inhibit the substrate (300) from being inserted in the reverse direction when engaging with the first body (100), similarly when a plurality of first coupling portions (150) are provided and the above alignment is implemented.

The first body (100) may include a lens holder (500). The lens holder (500) may be disposed on the barrel portion (120). The lens holder (500) may be coupled to the barrel portion (120). The lens holder (500) may be disposed in a hole (122) of the barrel portion (120). The lens holder (500) may include a plurality of lenses (510). The plurality of lenses (510) may be housed in the barrel. The lens holder (500) may be aligned with the image sensor (described later). The optical axis of the lens holder (500) may coincide with the optical axis of the image sensor. The first body (100) may include an infrared ray filter (IR filter) disposed between the lens holder (500) and the image sensor.

An outwardly projecting flange (530) may be disposed on an outer surface of the lens holder (500). When the lens holder (500) and the first body (100) are coupled, the flange portion (530) may be disposed on an upper surface of the barrel portion (120). To inhibit foreign matters from entering a space within the first body (100), a sealing member (610) may be disposed between a lower surface of the flange portion (530) and the upper surface of the barrel portion (120). The sealing member (610) may be a cured area of epoxy.

The camera module (10) may include a second body (200). The second body (200) may be referred to as one of a rear body, a lower housing, or a second housing. The second body (200) may be formed in a rectangular shape with an open top. The second body (200) may be formed of a metal material. The second body (200) may be disposed below the first body (100). The second body (200) may be coupled to the first body (100). The second body (200) may be coupled with the first body (100) to form an interior space. The second body (200) may include a space portion having a top surface opening.

The second body (200) may include a bottom plate (202). The bottom plate (202) may be opposite the top plate (111) of the body portion (110) of the first body (100). The bottom plate (202) may be spaced apart from the top plate (111) of the body portion (110) of the first body (100) in an optical axis direction. The bottom plate (202) may be parallel to the top plate (111) of the body portion (110) of the first body (100). The bottom plate (202) may be formed in a square shape. In this case, the corners of the bottom plate (202) may include a rounded shape at least in part.

The second body (200) may include a second side plate (204). The second side plate (204) may extend upwardly from the bottom plate (202). The second side plate (204) may extend from an outer edge of the bottom plate (202). A shield can (not shown) may be disposed on the second side plate (204). An inner surface of the second side plate (204) may be contacted by the shield can. An upper end of the second side plate (204) may be coupled to the first body (100). An outer surface of the second side plate (204) may be disposed inwardly of an outer surface of the first side plate (112) of the first body (100).

The second body (200) may include a connector ejection portion (290). The connector ejection portion (290) may be coupled to the bottom plate (202). The connector ejection portion (290) may have a connector (700) disposed therein. The connector ejection portion (290) may be formed of a metal material.

The second body (200) may include a second edge region (210). The second edge region (210) may be disposed on an outer side of the space portion of the second body (200). The second edge region (210) may be formed on an upper surface of the second side plate (204). The second edge region (210) may form an upper surface edge of the second body (200). The second edge region (210) may be disposed to face the first edge region (130) in an optical axis direction.

When the first body (100) and the second body (200) are joined, the first edge region (130) and the second edge region (210) may be disposed at least partially spaced apart in the optical axis direction. When the first body (100) and the second body (200) are joined, an adhesive receptacle may be formed between the first edge region (130) and the second edge region (210) in which the adhesive (620), which will be described later, is received.

The second edge region (210) may include a second protruding part (212) and a second groove (214) disposed on an outer side of the second protruding part. With respect to the optical axis direction, the first protruding part (132) and the second groove (214) may be disposed opposite each other, and the second protruding part (212) and the first groove (134) may be disposed opposite each other. In the optical axis direction, the bottom surface of the first protruding part (132) may be spaced a predetermined distance from the bottom surface of the second groove (214), and an upper surface of the second protruding part (212) may be spaced a predetermined distance from the bottom surface of the first groove (134).

The second protruding part (212) may be formed to project upwardly from an upper surface of the second body (200). The second protruding part (212) may be formed to project upwardly from an upper surface of the second side plate (204). The second protruding part (212) may be disposed at least partially on the inner side of the first groove (134). With respect to a direction perpendicular to the optical axis direction, the second protruding part (212) may be disposed to at least partially overlap the first protruding part (132). An upper surface of the second protruding part (212) may be disposed above a lower surface of the substrate (300) and may be disposed below an upper surface of the substrate (300). The upper surface of the second protruding (212) may be disposed above the lower surface of the first protruding part (132).

The second protruding part (212) may be less thick towards the top. The second protruding part (212) may have a width at the upwardly projecting end that is less than a width at the bottom. In addition, the second protruding part (212) may include a region that narrows in width toward the end. The outer surface of the second protruding part (212) may be formed with a slope that tapers in width towards the top. This shape creates a spaced apart region between the slope formed on the inner surface of the first protruding part (132) and the slope formed on the outer surface of the second protruding part (212), and the spaced apart region may contain the adhesive (620, described later).

The second groove (214) may be disposed on an outer side of the second protruding part (212). A bottom surface of the second groove (214) may be disposed lower than an upper surface of the second protruding part (212). The second groove (214) may be coupled to the first protruding part (132). The bottom surface of the second groove (214) may be spaced apart from the lower surface of the first protruding part (132) in an optical axis direction, but alternatively, the bottom surface of the second groove (214) and the lower surface of the first protruding part (132) may be in contact. The bottom surface of the second groove (214) may be disposed lower than the lower surface of the substrate (300). The bottom surface of the second groove (214) may be formed with a slope that is shaped such that the optical axis distance to the first protruding part (132) increases outwardly. Accordingly, a larger area for placement of the adhesive (620) may be formed between the bottom surface of the second groove (214) and the lower surface of the first protruding part (132).

On the other hand, the surfaces of the first body (100) and the second body (200) according to the present exemplary embodiment may each have a surface treatment area in which a film such as anodizing is formed. However, at least some of the surfaces of the first body (100) and the second body (200) may be a metal layer (M) where the base material within the first body (100) and the second body (200) is exposed to the outside. For example, as shown in FIG. 11, the metal layer (M) may be formed on a face of the first groove (134), a top surface of the second protruding part (212), an outer surface of the second protruding part (212), a bottom surface of the second groove (214), and a ground region in contact with the substrate (300).

To be more specific, the metal layer (M) may form a pattern on the lower surface of the first groove (134), the upper surface of the second protruding part (212), the outer surface of the second protruding part (212), and the bottom surface of the second groove (214). The pattern of the metal layer (M) may be formed in a structure in which a plurality of metal lines are spaced apart or connected to each other, as shown in FIG. 12. The metal layer (M) may have a groove shape that is recessed inwardly relative to other areas of the surface treatment. The metal layer (M) may allow for a stronger coupling force between the adhesive (620) and the first body (100) and the adhesive (620) and the second body (200).

On the other hand, for the bottom surface of the second groove (214), the metal layer (M) may be formed in a portion of the inner side except for the outermost end region, so that the adhesive (620) can be guided to flow inwardly. Accordingly, the adhesive (620) may be disposed between an inner surface of the first body (100) and a side of the substrate (300), and also between an inner surface of the second body (200) and a side of the substrate (300).

The second body (200) may include a third ground portion (230). The third ground portion (230) may have a shape that protrudes inwardly from an inner surface of the second side plate (204). The third ground portion (230) may have a shape that protrudes upwardly from the upper surface of the bottom plate (202). The third ground portion (230) may be disposed on an inner side of the second protruding part (212). An upper surface of the third ground portion (230) may be disposed lower than an upper surface of the second protruding part (212). The upper surface of the third ground portion (230) may contact a lower surface of the substrate (300). The region of the substrate (300) in contact with the lower surface of the third ground portion (230) may be a ground region. The third ground portion (230) may be provided in a plurality, and may be spaced apart from each other along the inner surface of the side plate (204).

The second body (200) may include a third guide (240). The third guide (240) may be formed to project upwardly from an upper surface of the bottom plate (202). The third guide (240) may be formed to project inwardly from an inner surface of the side plate (204). The third guide (240) may be disposed in an area that overlaps the first guide (160) in an upward and downward direction. An upper surface of the third guide (240) may contact a lower surface of the substrate (300). The upper surface of the third guide (240) may be disposed lower than the upper surface of the second protruding part (212).

A guide hole (242) may be formed on the upper surface of the third guide (240) that is recessed downwardly from other areas. The guide hole (242) may be coupled to the first guide (160) of the first body (100). The first-2 guide (164) of the first guide (160) may penetrate the substrate (300) and be coupled to the guide hole (242). The cross-sectional shape of the first-2 guide (164) may be formed to correspond to the cross-sectional shape of the guide hole (242). The lower surface of the substrate (300) that contacts the upper surface of the third guide (240) may be a ground region. Alternatively, the upper surface of the third guide (240) may not contact the lower surface of the substrate (300) and instead may be spaced apart from each other.

The camera module (10) may include a substrate (300). The substrate (300) may be a printed circuit board. The substrate (300) may be disposed between the first body (100) and the second body (200). The substrate (300) may be disposed to overlap the first edge region (130) or the second edge region (210) in a direction perpendicular to the optical axis direction.

An image sensor (not shown) may be disposed on an upper surface of the substrate (300). A connector (700) may be coupled to a lower surface of the substrate (300). The substrate (300) may be electrically connected to the connector (700). The substrate (300) may include a ground region, as described above. The ground region is an area where the copper foil of the substrate (300) is exposed, which may be referred to as the plating layer. The plating layers may be formed on the upper and lower surface of the substrate (300), respectively, and the plating layer formed on the upper surface and the plating layer formed on the lower surface may be interconnected through via holes or plating layers formed on the sides.

The substrate (300) may include a second coupling hole (320). The second coupling hole (320) may be formed to extend downwardly from an upper surface of the substrate (300). The second coupling hole (320) may be disposed to face the first coupling hole (152) of the first coupling portion (150). Thus, when the screw(S) is threaded through the second coupling hole (320) and into the first coupling hole (152), the substrate (300) and the first body (100) may be mutually coupled. The substrate (300) may include a second hole (340). The second hole (330) may be formed in a region facing the first guide (160) of the first body (100) and the third guide (240) of the second body (200). The second hole (330) may be formed to extend downwardly from the upper surface of the substrate (300). The second hole (330) may have a groove shape that recesses inwardly from a side surface of the substrate (300). The first guide (160) may pass through the second hole (330) and may be coupled to the guide hole (242) in the second body (2000. The second hole (330) may be formed to correspond in cross-sectional shape to the cross-sectional shape of the first-2 guide (164).

The substrate (300) may include a third hole (340). The third hole (340) may be formed in a region facing the second guide (170) of the first body (100). The third hole (340) may be formed to extend downwardly from an upper surface of the substrate (300). The third hole (340) may have a groove shape that recesses inwardly from the side of the substrate (300). The second guide (170) may be coupled to the third hole (340). Upon engagement of the second guide (170) into the third hole (340), a lower surface of the second guide (170) may be disposed to form a plane coplanar with a lower surface of the substrate (300). According to the above-described structure, while the first body (100) and the substrate (300) are coupled and the second body (200) is coupled, the coupling direction of the second body (200) may be initially guided by the connector ejection portion (290) and the connector (700), as shown in FIG. 14.

Furthermore, when the connector (700) in the connector ejection portion (290) is engaged, the coupling (engagement) direction of the second body (200) can be secondarily guided through the engagement of one end the first guide (160) of the first body 100 that has passed through the second hole (330) of the substrate (300) and the guide hole (242) of the second body (200).

Thus, the camera module (10) according to the present exemplary embodiment has the advantage in that the assembly direction between the plurality of configurations can be guided, thereby facilitating assembly and simplifying the manufacturing process.

In addition, since the first body (100), the second body (200), and the substrate (300) are electrically and mutually connected to each other through the first ground portion (140) and the second ground portion (180) of first body (100) respectively contacted to the upper and lower surface of the substrate (300) and the third ground portion (230) of the second body (200), external electromagnetic waves can be radiated to the outside without entering the components in the camera module, thereby further improving the electrical characteristics of the camera module and inhibiting the inclusion of noise in the electrical signals, thereby obtaining excellent quality images.

Furthermore, in the coupling area through the adhesive of the first body (100) and the second body (200), the pattern structure through the inclined surface (slope) and the metal layer can secure a large area for the placement of the adhesive, so that the coupling (bonding) force of the first body (100) and the second body (200) can be maintained more firmly. Furthermore, through the screw connection structure of the substrate (300) and the first body (100), it is advantageous that the distance between the image sensor (310) and the lens holder (500) can be kept constant.

While the exemplary embodiments of the present invention have been described above with reference to the accompanying drawings, it will be understood by one having ordinary skill in the art to which the invention belongs that the invention may be practiced in other specific forms without altering its technical ideas or essential features. It should therefore be understood that the embodiments described above are exemplary in all respects and not limiting.

The invention claimed is:
1. A camera module comprising:
a lens holder;
a first body in which the lens holder is disposed;
a second body coupled to the first body;

a substrate disposed between the first body and the second body; and an adhesive coupling the first body to the second body, wherein the first body includes a first protruding part, the second body includes a second groove facing the first protruding part, and the second groove has an inclined surface that is disposed on a bottom surface thereof and of which a distance to the first protruding part in a direction of an optical axis gradually increases toward an outer side thereof, and wherein the first protruding part decreases in thickness downwardly.

2. The camera module of claim 1, wherein a first coupling hole is disposed on a lower surface of the first body, and the substrate includes a second coupling hole facing the first coupling hole and a screw passing through the second coupling hole and coupling the first coupling hole.

3. The camera module of claim 1, wherein the first body includes a first ground portion contacting an upper surface of the substrate, and the second body includes a third ground portion contacting a lower surface of the substrate.

4. The camera module of claim 3, wherein the first body includes a second ground portion in contact with an upper surface of the substrate.

5. The camera module of claim 3, wherein an area of the substrate in contact with the first ground portion and the third ground portion is a ground area.

6. The camera module of claim 1, wherein the first body includes a first guide, and the substrate includes a second hole through which the first guide passes.

7. The camera module of claim 6, wherein the second body includes a guide hole through which the first guide is coupled.

8. The camera module of claim 1, wherein the second body includes a second guide, and the substrate includes a third hole through which the second guide passes.

9. The camera module of claim 1, wherein an outer surface of the first body is disposed outwardly from an outer surface of the second body.

10. The camera module of claim 1, wherein an outer surface of the first body is disposed outside an outer surface of the second body.

11. The camera module of claim 1, wherein the first body includes a first groove disposed inside the first protruding part, wherein the second body includes a second protruding part facing the first groove, and wherein the adhesive is disposed between the first groove and the second protruding part.

12. The camera module of claim 11, wherein the second protruding part has an inclined surface formed on its outer surface whose thickness becomes thinner as it goes upward.

13. The camera module of claim 11, wherein the adhesive is disposed between a side of the substrate and an inner surface of the first body, and between the side of the substrate and an inner surface of the second body.

14. A camera module comprising:

a lens holder;

a first body in which the lens holder is disposed;

a second body coupled to the first body;

a substrate disposed between the first body and the second body; and an adhesive coupling the first body to the second body, wherein the first body includes a first protruding part, the second body includes a second groove facing the first protruding part, and the second groove has an inclined surface that is disposed on a bottom surface thereof and of which a distance to the first protruding part in a direction of an optical axis gradually increases toward an outer side thereof, and wherein a pattern exposing a metal layer of the first body or the second body is formed on a surface of at least one of the first protruding part or the second groove.

15. The camera module of claim 14, wherein the pattern has a structure in which a plurality of metal lines are spaced apart from or connected to each other.

16. The camera module of claim 14, wherein the metal layer has a recessed groove shape compared to a surface-treated region.

17. The camera module of claim 14, wherein the metal layer forms a grounding region.

18. A camera module comprising:

a lens holder;

a first body in which the lens holder is disposed;

a second body coupled to the first body;

a substrate disposed between the first body and the second body; and an adhesive coupling the first body and the second body, the first body comprising a first protruding part, a first groove disposed on an inner side of the first protruding part, and the second body comprising a second groove facing the first protruding part, a second protruding part facing the first groove, wherein the adhesive is disposed between the first protruding part and the second groove and between the second protruding part and the first groove, and wherein a surface of at least one of the first protruding part, the first groove, the second protruding part, and the second groove is formed in a pattern with an exposed metal layer of the first body or the second body.

* * * * *